Figure 1:
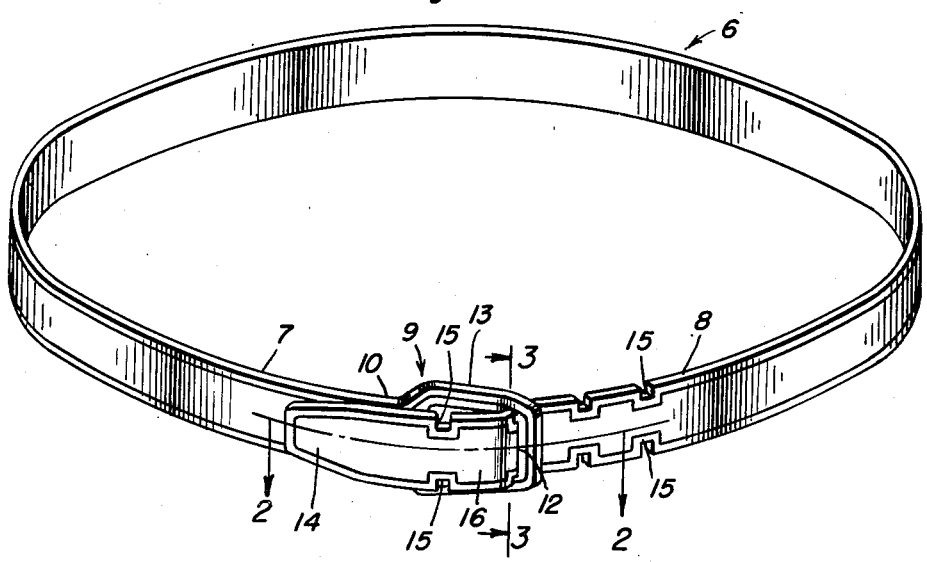

Feb. 20, 1951     W. D. COSTNER     2,542,479
APPAREL BELT
Filed Nov. 16, 1948

Inventor
Wayne D. Costner

By *Clarence A. O'Brien and Harvey B. Jacobson*
Attorneys

Patented Feb. 20, 1951

2,542,479

UNITED STATES PATENT OFFICE 2,542,479

APPAREL BELT

Wayne D. Costner, Stevens Point, Wis.

Application November 16, 1948, Serial No. 60,330

1 Claim. (Cl. 2—321)

This invention relates to certain new and useful improvements in body encircling belts and has reference, more particularly, to novel ways and means for separably joining the co-acting ends of a belt.

More specifically, novelty has to do with end-joining means wherein one end portion has a slot and the other end, which has retaining and keeper notches, is fed through said slot, is wedged at one end of latter and thus lodged firmly, whereby to thus separably connect said ends.

It is a matter of common knowledge that a number of different types of so-called buckleless belts have been devised. Those who have attempted to provide belts without buckles and equivalent fasteners have generally utilized an arrangement wherein one free end portion of the belt is provided with a slot or equivalent aperture and the other coacting end is fed through the aperture and lodged therein by way of marginal or edge notches. For example, there is the patent of J. K. Seitz granted November 18, 1947, and identified by Number 2,430,957. In the Seitz belt construction the multiple notch equipped end is passed through a longitudinal slot in the cooperating end, the slot having a restricted crotch at one end and the notched end portion being lodged in the opposite or wider end of the slot. In order to fasten the ends together in the patented construction it is necessary to twist the notched end and to thread said end through the slot or aperture.

In carrying out the principles of the instant invention I also employ a strap or belt, one end of which has pairs of opposed notches serving as keepers, the latter suitably arranged in the marginal edge portions. The improvement, however, resides in the provision of an enlarged head on the opposite end portion of the belt which head has a trapezoidal slot with its narrow end located at the outer free tip portion of the head whereby to provide an effective wedge-like adapter for said notched end and making it possible to interconnect the ends with simplicity and expediency and obviating the necessity of axially twisting the notched end for joining the latter with the headed end.

Other objects and advantages will become more readily apparent from the following description and the accompanying illustrative drawings.

Figure 2:
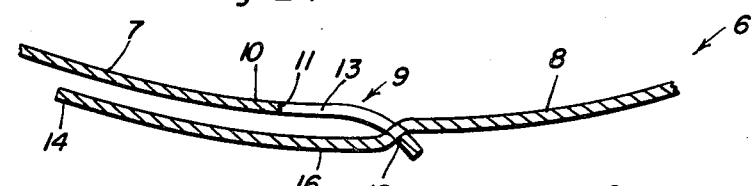
Figure 4:
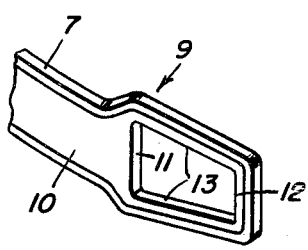
Figure 3:
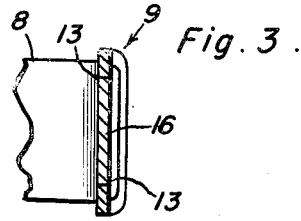

In the drawings, wherein like numerals are employed to designate like parts throughout the views:

Figure 1 is a perspective view of a belt constructed in accordance with the invention showing my improvements and illustrating the manner in which they coact with each other;

Figures 2 and 3 are longitudinal and vertical sections on the lines 2—2 and 3—3 respectively of Figure 1; and Figure 4 is a fragmentary perspective view of the aforementioned headed end of the belt.

Referring now to the drawings by reference numerals and lead lines, the belt proper is denoted by the numeral 6 and is of leather, plastic or other material from which trouser supporting belts are commonly constructed. The preferred embodiment is a leather belt. The connectible and separable end portions are denoted and distinguished by the numerals 7 and 8 respectively. The end 7 is fashioned into a frame-like head 9 the inner end being considerably wider than the adjacent body portion 10 and the outer end being appreciably narrower. Said head has the aforementioned trapezoidal slot formed therein and the transverse wide inner end of the slot is denoted by the numeral 11, the opposed transverse narrow end by the numeral 12 and the longitudinal side portions by the numerals 13. These side portions converge toward the narrow end 12 and coact therewith in providing a wedge-like adapter for the end portion 8. The free or terminal end of the end portion 8 is tapered to provide a cuneiform piloting tip 14 which is fed through the trapezoidal slot in an obvious manner. The longitudinal edge portions have opposed pairs of keeper notches 15 which in operation lodge themselves in the wedge-shaped adapter or narrower end portion of the slotted head. I call attention to the fact that the body portion of the end 8, that is the portion 16 is of the same width as the end portion 7 but is slightly narrower than the widest or left hand end portion of the trapezoidal slot, that is the end 11 of the slot. This makes it possible to pilot the cuneiform end 14 through the slot without impediment. Then, when the two ends 7 and 8 are pulled in directions away from each other, when the belt is under tension, the chosen keeper notches wedge themselves into the restricted or narrow end portion 12 of said slot.

Novelty is predicated as stated on the enlarged head 9 having a longitudinal trapezoidal slot characterized by edges 11, 12 and 13, the edges 13 converging toward the free tip end 12 so as to provide an adapter crotch in which the notched portions may be wedged and firmly lodged in place. This makes it possible to slip the cuneiform tip 14 through the wider end 11 and readily join as well as separate the end portions 7 and 8 in an obvious manner.

A careful consideration of the foregoing description in conjunction with the invention as illustrated in the drawings will enable the reader to obtain a clear understanding and impression of the alleged features of merit and novelty sufficient to clarify the construction of the invention as hereinafter claimed.

Minor changes in shape, size, materials or rearrangement of parts may be resorted to in actual practice so long as no departure is made from the invention as claimed.

Having described the invention, what is claimed as new is:

A body encircling garment supporting belt comprising a conventional-type leather strap having separable and connectible end portions, one end portion of said strap having an enlarged head provided with a trapezoidal slot embodying an outwardly disposed narrow end, a relatively wide inwardly disposed end and adjoining longitudinal sides, the latter converging toward said narrow end and defining a wedge shaped strap-end retention crotch, the other end portion of said strap being reduced in width to provide a cuneiform piloting tip which is adapted to pass freely through said slot, the body portion of said last-named end portion, inwardly of said piloting tip, being of a width slightly less than the wide end of said slot and having pairs of selectively usable keeper notches in its marginal edges shiftably engageable with the converging longitudinal sides of said slot, whereby said second-named end portion may be passed, without the necessity of axial twisting, directly through the wide end portion of the slot and then drawn and shifted for retentive lodgment in said crotch.

WAYNE D. COSTNER.

REFERENCES CITED

The following references are of record in the file of this patent:

UNITED STATES PATENTS

| Number | Name | Date |
|---|---|---|
| 109,737 | House | Nov. 29, 1870 |
| 690,863 | Loeffelholz | Jan. 7, 1902 |
| 1,810,027 | Moran et al. | June 16, 1931 |
| 2,361,506 | Smith | Oct. 31, 1944 |
| 2,430,957 | Seitz | Nov. 18, 1947 |